US012451210B2

(12) United States Patent
Negi et al.

(10) Patent No.: US 12,451,210 B2
(45) Date of Patent: Oct. 21, 2025

(54) DATA STORAGE DEVICE AND METHOD FOR READ DISTURB MITIGATION DURING LOW-POWER MODES

(71) Applicant: Sandisk Technologies, Inc., Milpitas, CA (US)

(72) Inventors: Pawan Kumar Negi, Bengaluru (IN); Meer Afroz Mohammed, Bengaluru (IN); Bhavadip Bipinbhai Solanki, Bengaluru (IN)

(73) Assignee: Sandisk Technologies, Inc., Milpitas, CA (US)

( * ) Notice: Subject to any disclaimer, the term of this patent is extended or adjusted under 35 U.S.C. 154(b) by 127 days.

(21) Appl. No.: 18/411,397

(22) Filed: Jan. 12, 2024

(65) Prior Publication Data

US 2025/0232829 A1    Jul. 17, 2025

(51) Int. Cl.
*G11C 29/02*  (2006.01)
*G11C 29/00*  (2006.01)
*G11C 29/52*  (2006.01)

(52) U.S. Cl.
CPC ............ *G11C 29/52* (2013.01); *G11C 29/022* (2013.01); *G11C 29/886* (2013.01)

(58) Field of Classification Search
CPC ...... G11C 29/52; G11C 29/022; G11C 29/886
See application file for complete search history.

(56) References Cited

U.S. PATENT DOCUMENTS

| | | | |
|---|---|---|---|
| 11,531,473 B1* | 12/2022 | Ionin ................... | G06F 11/1068 |
| 2021/0183456 A1* | 6/2021 | Muchherla ............ | G06F 11/076 |
| 2022/0300369 A1* | 9/2022 | Sharon ................ | G06F 11/1044 |
| 2022/0383962 A1* | 12/2022 | Muchherla ............ | G06F 11/076 |

* cited by examiner

*Primary Examiner* — Mohammed A Bashar
(74) *Attorney, Agent, or Firm* — Crowell & Moring LLP

(57) ABSTRACT

A data storage device can check data integrity on a wordline in memory each time the data storage device exits a low-power mode. Frequent exits from the low-power mode result in the wordline being read many times, which can result in a read disturb problem. To mitigate this problem, in one embodiment disclosed herein, a different wordline is used to check data integrity each time of a plurality of times that the data storage device exits a low-power mode. Using different wordlines for the data integrity check can reduce the likelihood of a read disturb error. Other embodiments are disclosed.

18 Claims, 11 Drawing Sheets

| | LPM Transitions | POH (Power on hours) | BER estimation READ (Considering # of ARS WL = 'n') | RD problem occurrence Probability | % occurrence of RD problem |
|---|---|---|---|---|---|
| Old | 5.4 million | 414 | ~5.4 million | 1 | 100% |
| New | 5.4 million | 414 | 5.4 million/n | 1/n | 100/n% |

| | LPM Transitions | POH | BER estimation READ | RD problem occurrence Probability | % occurrence of RD problem |
|---|---|---|---|---|---|
| Example # of ARS WL=20 | 5.4 million | 414 | 5.4 million / 20 = 270K (270K is well within the spec of NAND read endurance) | 1/20 | 5% |

FIG. 9

DATA STORAGE DEVICE AND METHOD FOR READ DISTURB MITIGATION DURING LOW-POWER MODES

BACKGROUND

Some data storage devices are configured to support a low-power mode. In general, a low-power mode refers to an operational state of the data storage device designed to reduce power consumption when not actively performing a task. Low-power mode can improve energy efficiency and meet power specifications of a host (e.g., to extend the battery life of the host). In transitioning between active and low-power modes, the data storage device can carry out procedures to ensure data integrity within the memory of the data storage device.

BRIEF DESCRIPTION OF THE DRAWINGS

FIG. 9 is a table illustrating occurrences of a read disturb problem of an embodiment.

DETAILED DESCRIPTION

The following embodiments generally relate to a data storage device and method for read disturb mitigation during low-power modes. In one embodiment, a data storage device is provided comprising a memory and one or more processors. The one or more processors, individually or in combination, are configured to: receive a command from a host to exit a low-power mode; and in response to receiving the command from the host to exit the low-power mode: randomly select a wordline from a set of wordlines in the memory designated for an active read scan; perform a bit error rate (BER) check on the randomly-selected wordline and its neighbor wordlines; determine whether there is a BER failure on the randomly-selected wordline or its neighbor wordlines; and in response to determining that there is a BER failure on the randomly-selected wordline or its neighbor wordlines, perform a BER estimation scan (BES) of the memory.

In another embodiment, a method is provided that is performed in a data storage device comprising a memory. The method comprises: each time of a plurality of times that the data storage device transitions from a low-power mode to an active mode: selecting a wordline in the memory, wherein a different wordline is selected in response to each time of the plurality of times; determining whether a number of errors in the selected wordline is above a threshold; and in response to determining that the number of errors in the selected wordline is above the threshold, relocating data in the selected wordline to another wordline in the memory.

In another embodiment, a data storage device is provided comprising: a memory; and means for checking data integrity on a different wordline in the memory each time of a plurality of times that the data storage device exits a low-power mode, wherein checking data integrity on different wordlines decreases a likelihood of a read disturb error.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Figure 1A:
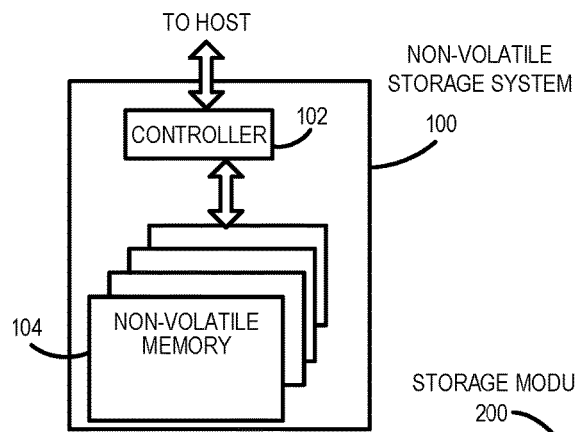
FIG. 1A is a block diagram of a data storage device of an embodiment.
Figure 1B:
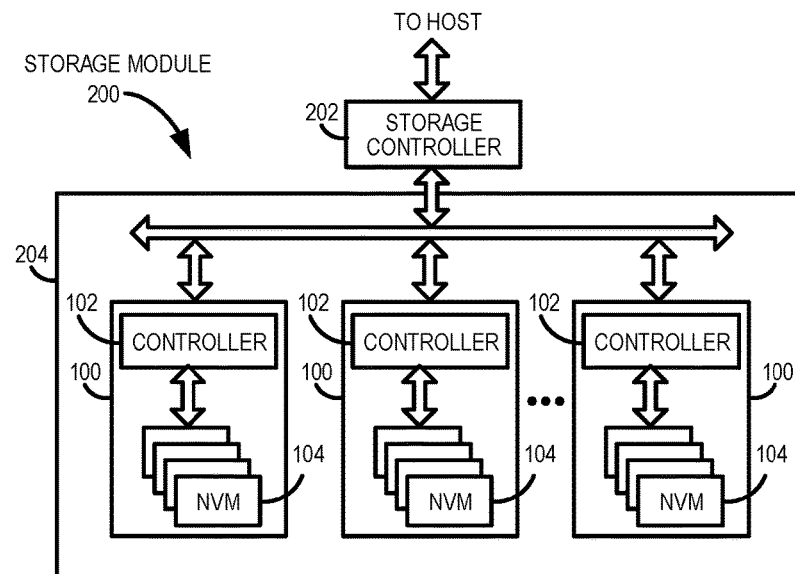
FIG. 1B is a block diagram illustrating a storage module of an embodiment.
Figure 1C:
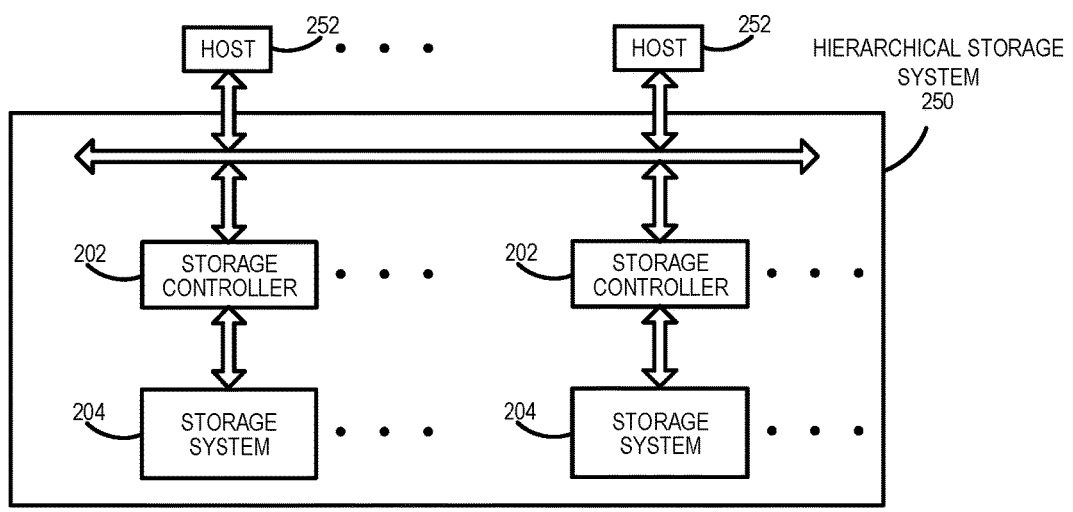
FIG. 1C is a block diagram illustrating a hierarchical storage system of an embodiment.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
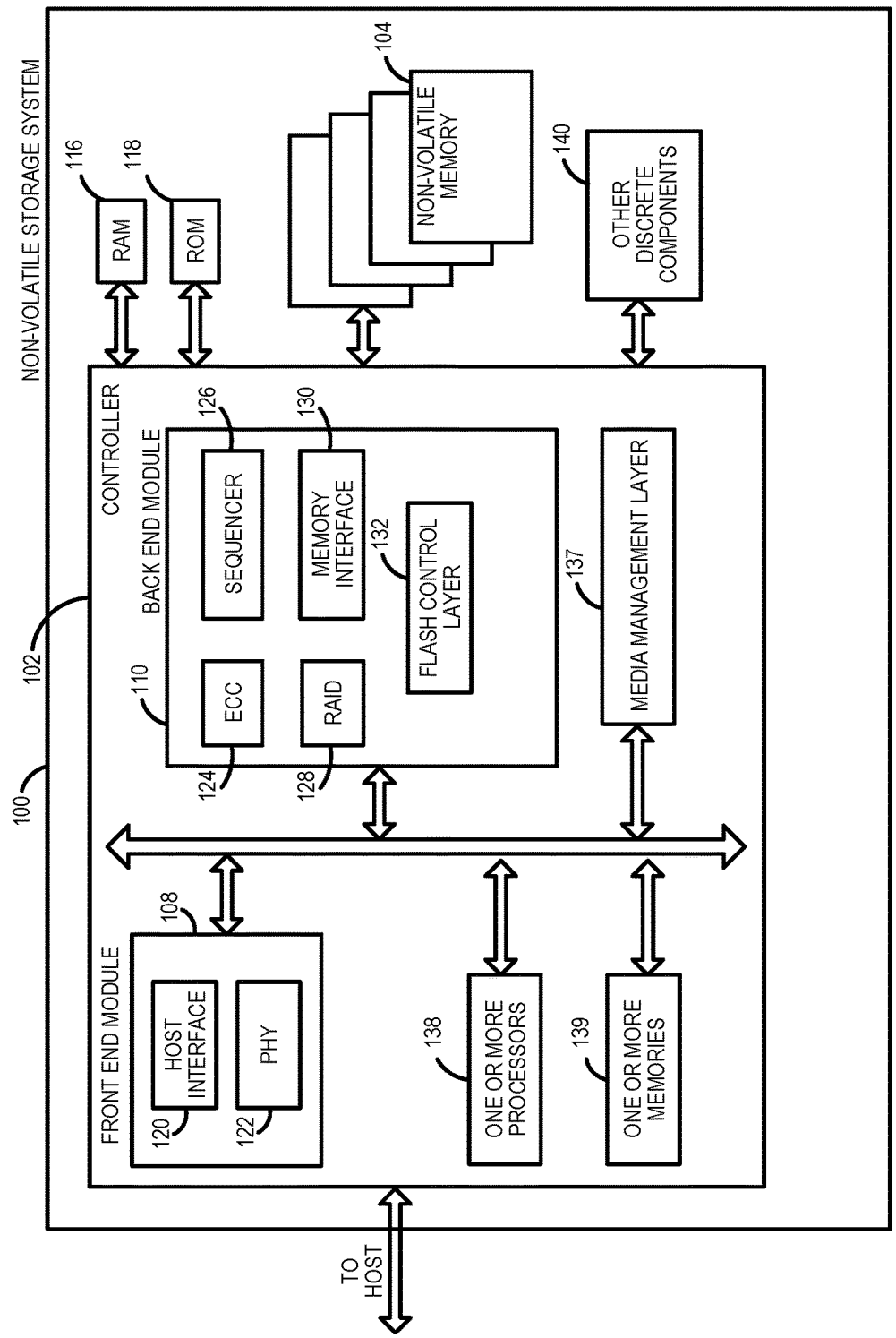
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
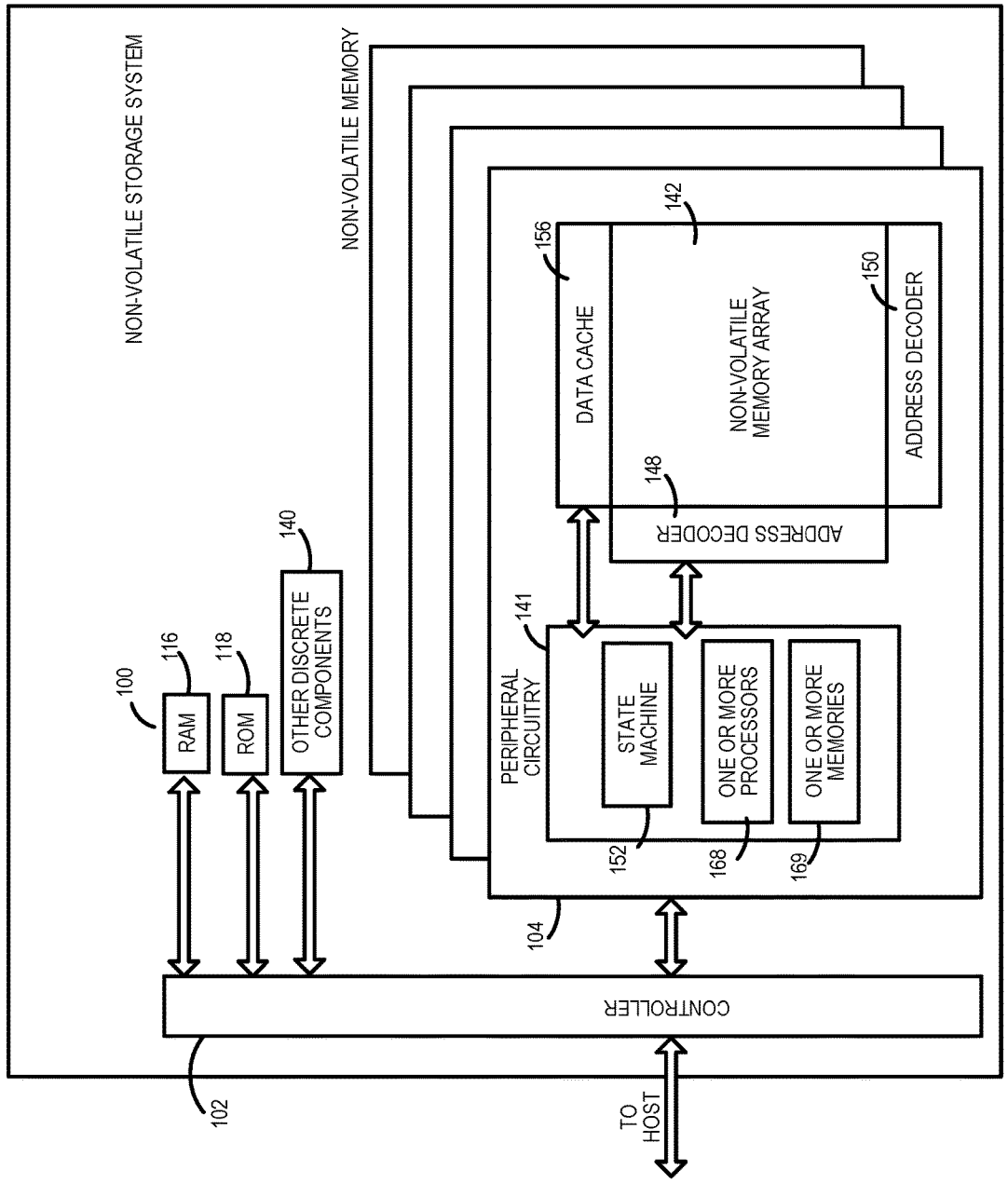
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
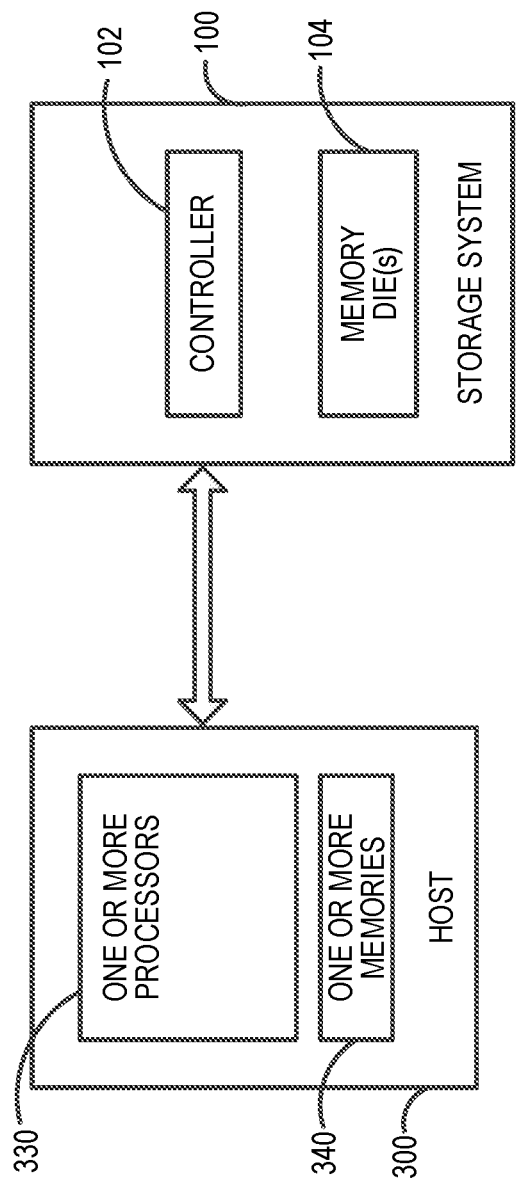
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

The data storage device 100 can be configured to support a low-power mode (LPM). In general, a low-power mode refers to an operational state of the data storage device 100 designed to reduce power consumption when it is not actively performing a task. Low-power mode can improve energy efficiency and meet power specifications of the host 300 (e.g., to extend the battery life of the host 300). In some embodiments, the data storage device 100 can be operated in an active mode (P0/P1/P2) or in a low-power mode (PS3/PS4/PS5). When the data storage device 100 transitions from one power mode to another (e.g., from power mode A to power mode B), this is referred to as an exit from mode A and an entry to mode B. During the entry to and exit from a power mode, the controller 102 of the data storage device 100 can carry out specific procedures to ensure data integrity within the memory 104. There are situations in which the host 300 can actively utilize low-power mode to save energy by frequently switching between active and low-power modes. However, the memory 104 of the data storage device 100 may only support limited read disturb/endurance.

Read disturb issues may occur when transitioning power modes. During a read operation, a voltage is applied to a memory cell (e.g., a particular wordline in NAND memory) to measure the stored charge and determine the data value. If there are repetitive read operations, neighboring cells (wordlines) can get affected by the voltage applied during the read process. The nearest wordlines (WL+1 and WL−1) to the wordline (WL) being read are the most affected by this problem, and this phenomenon is known as read disturb.

Due to the current technological advancements in the personal computing industry, there is often a need to operate a data storage device with the lowest-possible power. There is currently no specific standard or JEDEC specification that mandates a fixed number of times a data storage device should go into low-power mode. Without an established industry standard or restriction for low-power mode transitions, it is anticipated that a significant number of low-power mode requests will occur and that data storage devices must handle them accordingly.

When transitioning from low power mode to active mode (LPM to Active), the controller 102 in the data storage device 100 lacks information about the duration spent in low power mode. This uncertainty in time prompts the system to inspect for potential reliability problems arising during the low-power mode period. To address these reliability concerns, the controller 102 can conduct an initial read called a bit error rate (BER) estimation read to judge the reliability impact on the memory 104. As the BER estimation read helps to optimize the read levels, it may be a common requirement of data storage devices. A "first read issue" can occur, as the bit error rate can depend on the time gap between a memory block's most-recent access and a subsequent read operation. When blocks are in a first read condition, a read decode failure can happen if there is a long delay between the reads/power-up and power-down.

The inventors have made two significant observations in analyzing data storage devices that have failed in customer environments due to read disturb issues. First, the host 300 requested approximately 5-7 million low-power mode transitions within a short span of time. Second, the low-power mode frequency for each low-power mode (average time) is calculated at ~0.2 seconds per low-power mode.

Figure 4:
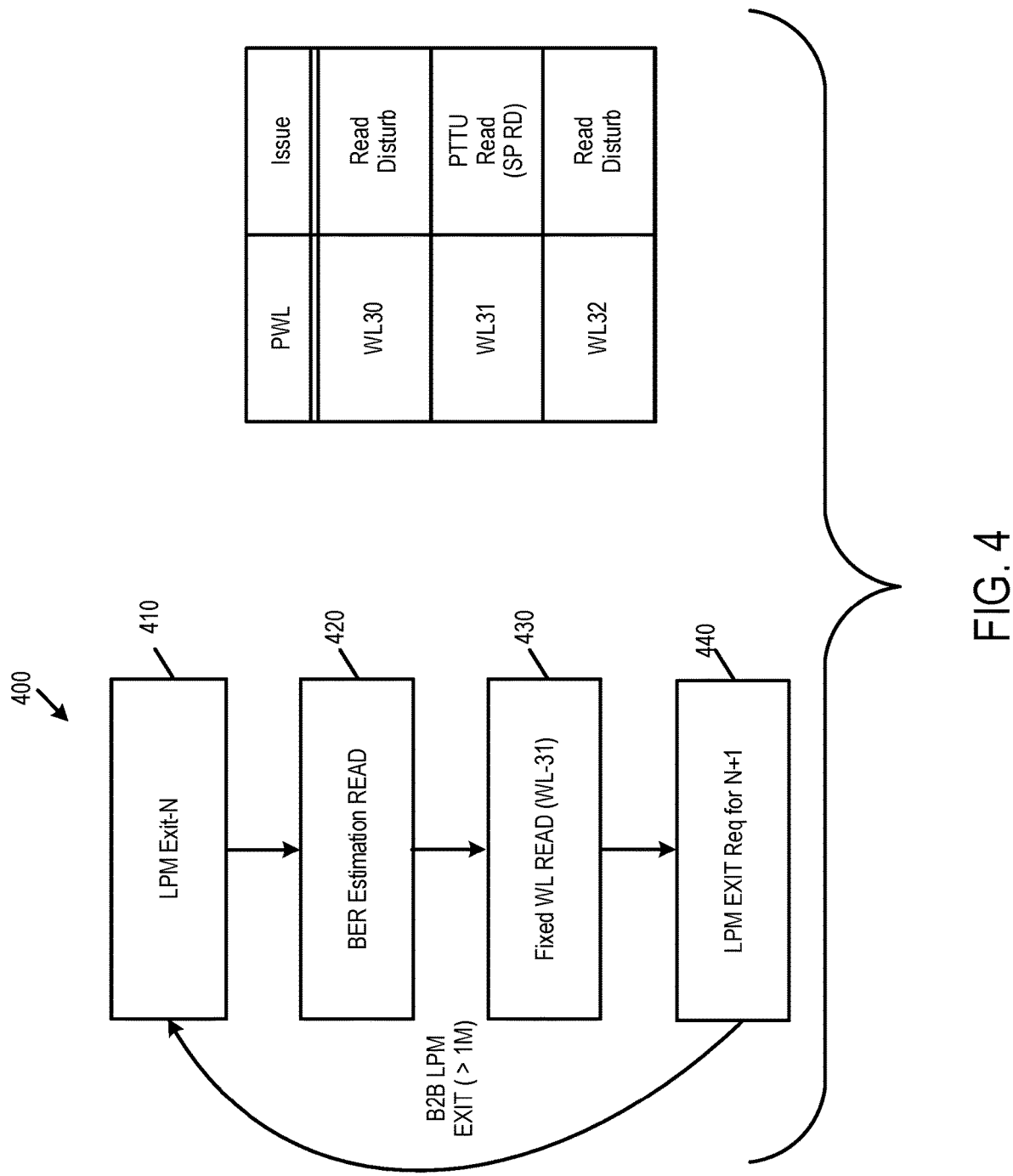
FIG. 4 is a flow chart of a method of an embodiment for estimating bit error rate (BER) upon exiting a low-power mode.

Turning again to the drawings, FIG. 4 is a flow chart 400 of a method of an embodiment for estimating bit error rate (BER) upon exiting a lower power mode. As shown in FIG. 4, in response to a request for a low-power mode (LPM) exit N (act 410), the controller 102 performs a BER estimation read on wordline (WL) 31 (acts 420 and 430). This is followed by an LPM exit request for N+1 (act 440). As shown in the chart in FIG. 4, requesting a BER estimation on WL31 upon a low-power mode exit causes a read disturb on neighboring wordlines WL30 and WL32.

Given the high frequency of transitions, the controller 102 can manage only a single read operation for each low-power mode before returning to low-power mode. With this, the controller 102 always ends up doing the first read switch back to low-power mode. Also, considering the substantial volume of low-power mode transitions, approximately 5-7 million low-power mode transitions can result in an equivalent number of read operations. The BER estimation reads are mostly fixed to a specific block and a specific wordline in the block. This, in turn, increases the likelihood of read disturb occurring on the neighbor wordline.

To study the impact of read disturb, the inventors conducted an experiment, which revealed that performing approximately 150K consecutive reads on a wordline is sufficient to trigger read-disturb effects on neighboring wordlines. However, data also show that the host performed low-power mode transitions in the range of 5-7 million times, which can make the read disturb problem even worse. The bit error rate profile across wordlines showed the wordlines being affected by the read disturb problem caused by consecutive reads during low-power mode transitions. The low-power mode LPM transitions can go as high as ~10 million, while the need to perform BER estimation reads to achieve an optimal read level remains unchanged. Despite this, there can be a need to mitigate the risk of read disturb problems caused during low-power mode transitions. The following embodiments provide version solutions to this issue.

One embodiment utilizes an "always-on timer" (an "AON timer"). An AON timer refers to a type of timer in electronic devices that operates independently of the main system or processor. AON timers are functional even when the device is in a low-power mode or in a sleep mode. AON timers ensure accurate timing and perform specific functions at set intervals, even when the main system is inactive. In this embodiment, an AON timer (e.g., in the controller 102) accumulates the duration (e.g., drive duration in each power state) of each low-power mode (PS3/PS4/PS5) and decides the need for the BER estimation read. A time threshold (e.g., "X hours") can be configured, and if the cumulative low-power mode time exceeds this threshold, only then will the controller 102 perform a BER estimation read to optimize the read levels.

Figure 5:
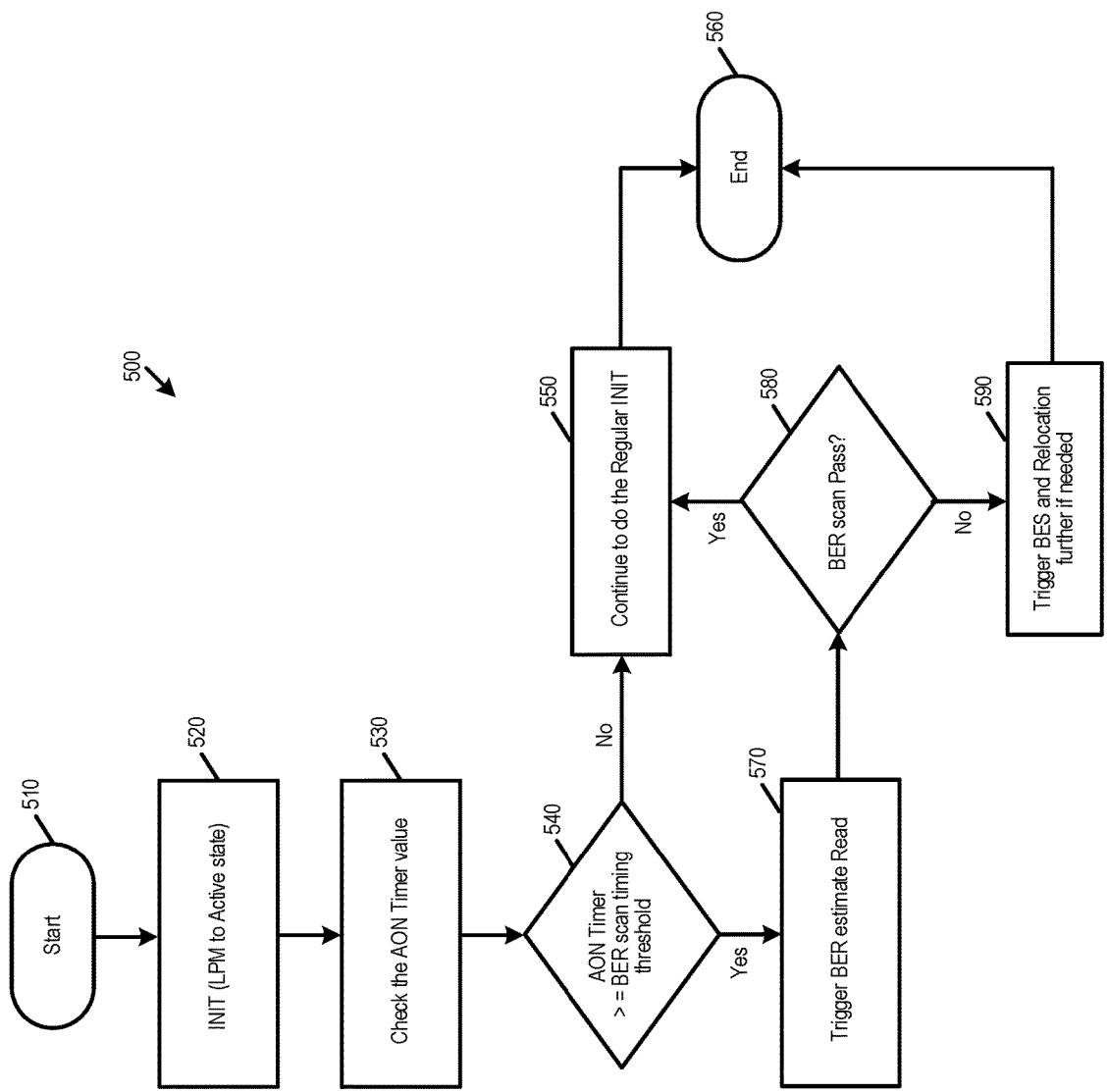
FIG. 5 is a flow chart of a method of an embodiment for a BER estimating read trigger.

Turning again to the drawings, FIG. 5 is a flow chart 500 of a method of an embodiment for a BER estimating read trigger. As shown in FIG. 5, after the start (act 510) of the method, the controller 102 performs an initialization process in which the low-power mode (LPM) is transitioned to the active state (act 520). Next, the controller 102 checks the always-on (AON) timer value (act 530) and determines if the AON timer value is greater than or equal to the BER scan timing threshold (act 540). If the AON timer value is not greater than or equal to the BER scan timing threshold, the controller 102 continues with the regular initialization process (act 550) and the method ends (act 560). However, if the AON timer value is greater than or equal to the BER scan timing threshold, the controller 102 triggers a BER estimate read (act 570) and determines if the BER scan passes (act 580). If the BER scan passes, the controller 102 continues with the regular initialization process (act 550), and the method ends (act 560). However, if the BER scan does not pass, the controller 102 triggers a BER estimation scan (BES), and further relocation is performed if needed (act 590), after which the method ends (act 560).

As shown by this example, using an AON timer-based approach provides the advantage of managing the frequency of BER estimation read triggers during low-power mode transitions, thereby preventing unnecessary BER estimations, ensuring that these estimations occur only at necessary intervals (e.g., every six hours of accumulated lower-power mode time (considering all LPM states)). This strategy effectively addresses the risk of read disturb while upholding the data storage device's reliability specifications. For example, in a situation in which there are a total of 5.4 million low-power mode transitions and 414 power-on hours, using this embodiment with a time threshold of six hours (based on an estimated three-year lifespan of the data storage device) can result in about 70 BER estimation reads, as compared to about 5.4 million BER estimation reads if this embodiment is not used. This significant reduction in the BER estimation reads reduces the risk of a read disturb.

Another embodiment uses an active read scan (ARS) to scan the memory 104 and minimize reliability risks. ARS is a read scrub algorithm that is designed to keep a check on the quality of data stored in each physical block of the memory 104 and relocate it to a new location before it becomes unreadable. ARS can be used to address phenomena, such as program disturb and read disturb, that tend to affect the integrity of the data stored in the memory 104 and can result in high BER events, correctable error correction code (CECC) events, or uncorrectable error correction code (UECC) events that affect system performance and product defective parts per millions (DPPM). ARS can be a periodic operation that is performed by the controller 102. For example, the controller 102 can perform ARS every 24 hours on a set of wordlines (e.g., about 20 wordlines) that gets scanned during a BER check.

In this embodiment, the controller 102 uses these ARS wordlines as part of the BER check during a low-power mode transition. The controller 102 can add the neighboring wordlines to the scan list, so that any read-disturb phenomena can be identified by the controller's ARS scan algorithm. Currently, the low-power mode BER estimation wordline is fixed to a single wordline within a block. Instead of having a fixed wordline, the controller 102 in this embodiment can randomize among "X" (e.g., 20) wordlines from the list of ARS wordlines, and the BER check can be done on the random wordline. By doing so, the read-disturb can be distributed among a set of wordlines within a block rather than being concentrated solely on one wordline. Also, these sets of wordlines are already part of the ARS scan, and in case of any read disturb, these wordlines will be scanned, and the block will get relocated.

In summary, this embodiment reduces the risk of read disturb by distributing the reads to multiple wordlines and giving these wordlines protection using ARS and a neighbor-wordline scan algorithm. This embodiment will now be further illustrated in conjunction with FIGS. 6-8.

Figure 6:
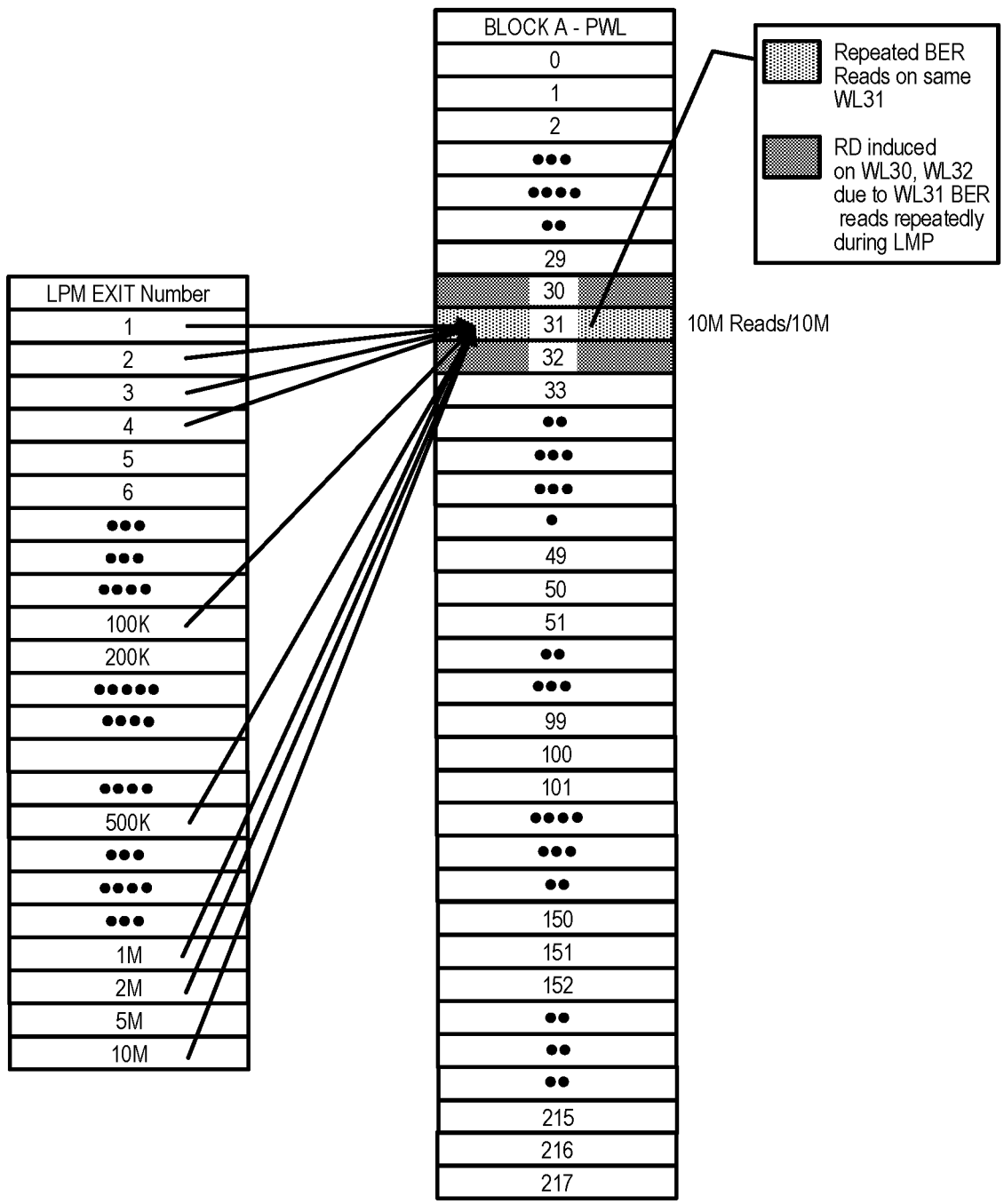
FIG. 6 is a diagram that illustrates exiting a low-power mode of an embodiment.
Figure 7:
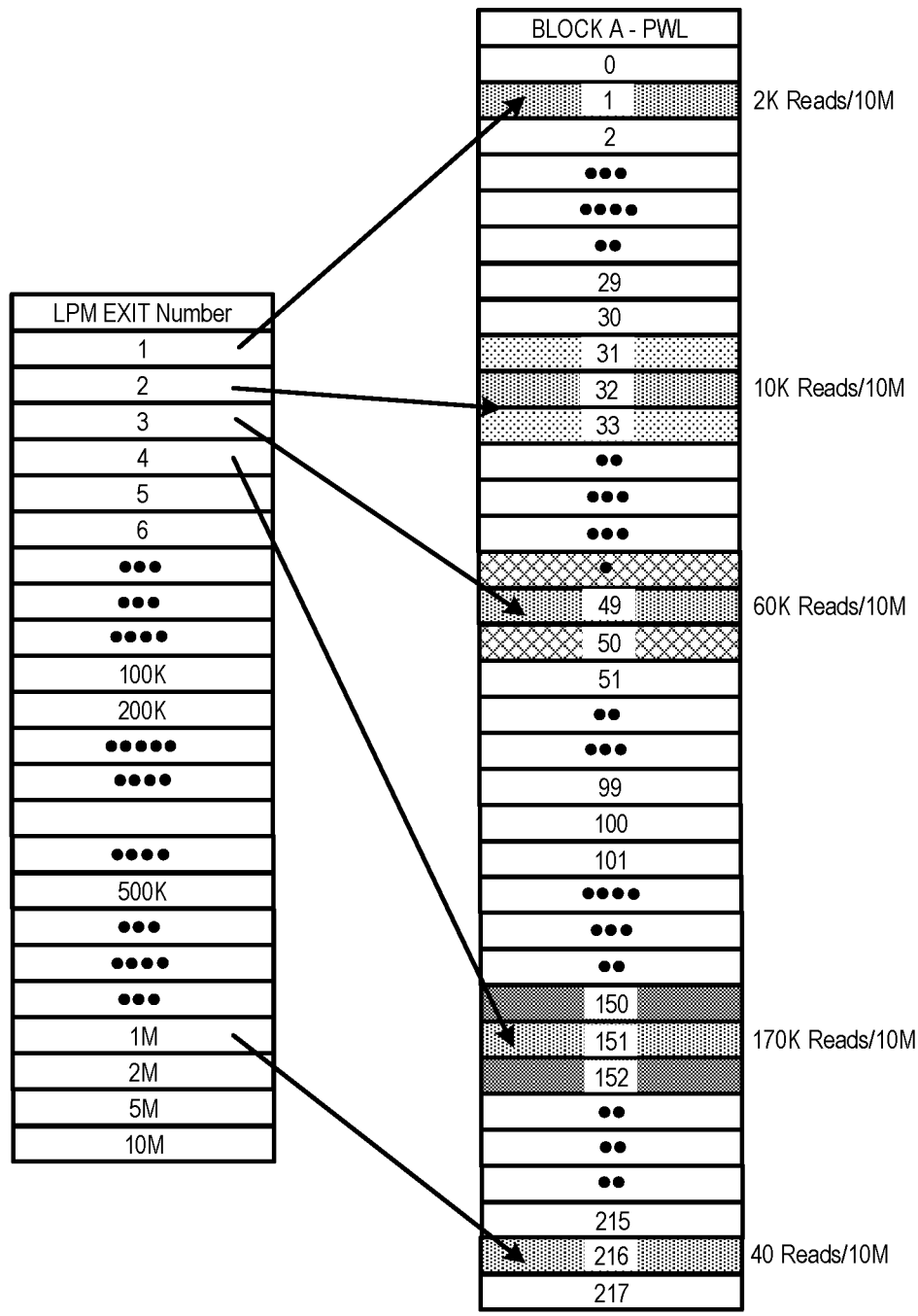
FIG. 7 is a diagram that illustrates exiting a low-power mode of an embodiment.
Figure 8:
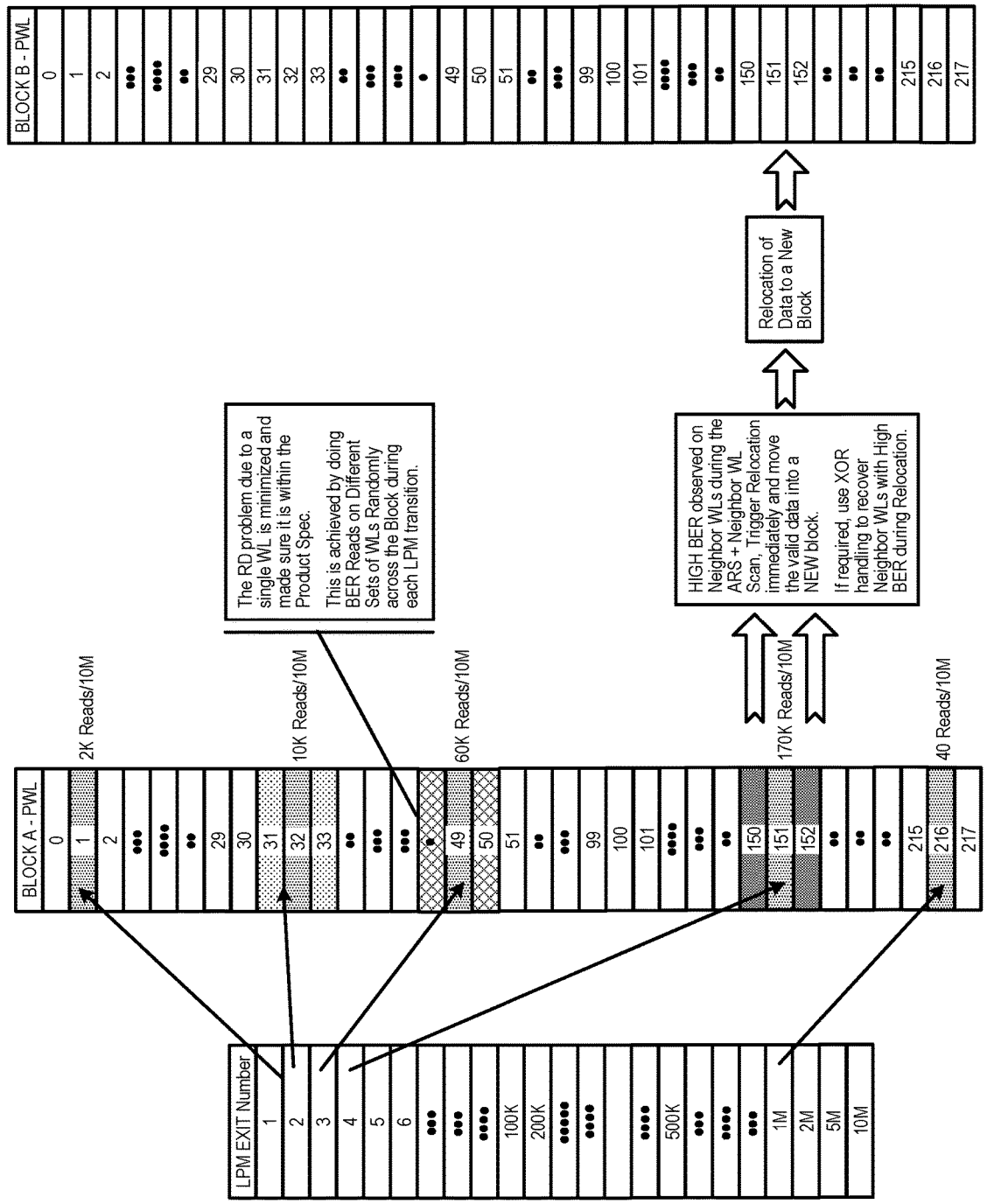
FIG. 8 is a diagram that illustrates an embodiment in which relocation is triggered due to detection of a high BER.

FIG. 6 is a diagram that illustrates exiting a low-power mode using an approach where each low-power mode transition is routed as a BER estimation read to a fixed wordline (here, WL31). Consecutive reads can cause read disturbs on the neighbor wordlines (here, WL30 and WL32). FIG. 7 is a diagram that illustrates exiting a low-power mode using the approach of this embodiment. As shown in FIG. 8, with this embodiment, the controller 102 randomly picks one wordline among the ARS wordlines (e.g., 20 wordlines) to perform the BER estimation read. By doing this, the read-disturb impact on a single wordline is reduced. Due to consecutive low-power mode transitions, if the BER is high on the neighbor wordlines, the ARS scan will catch it (the neighbor wordlines are already part of ARS wordlines) and will relocate the block. FIG. 9 is a table illustrating occurrences of a read disturb problem.

Figure 10:
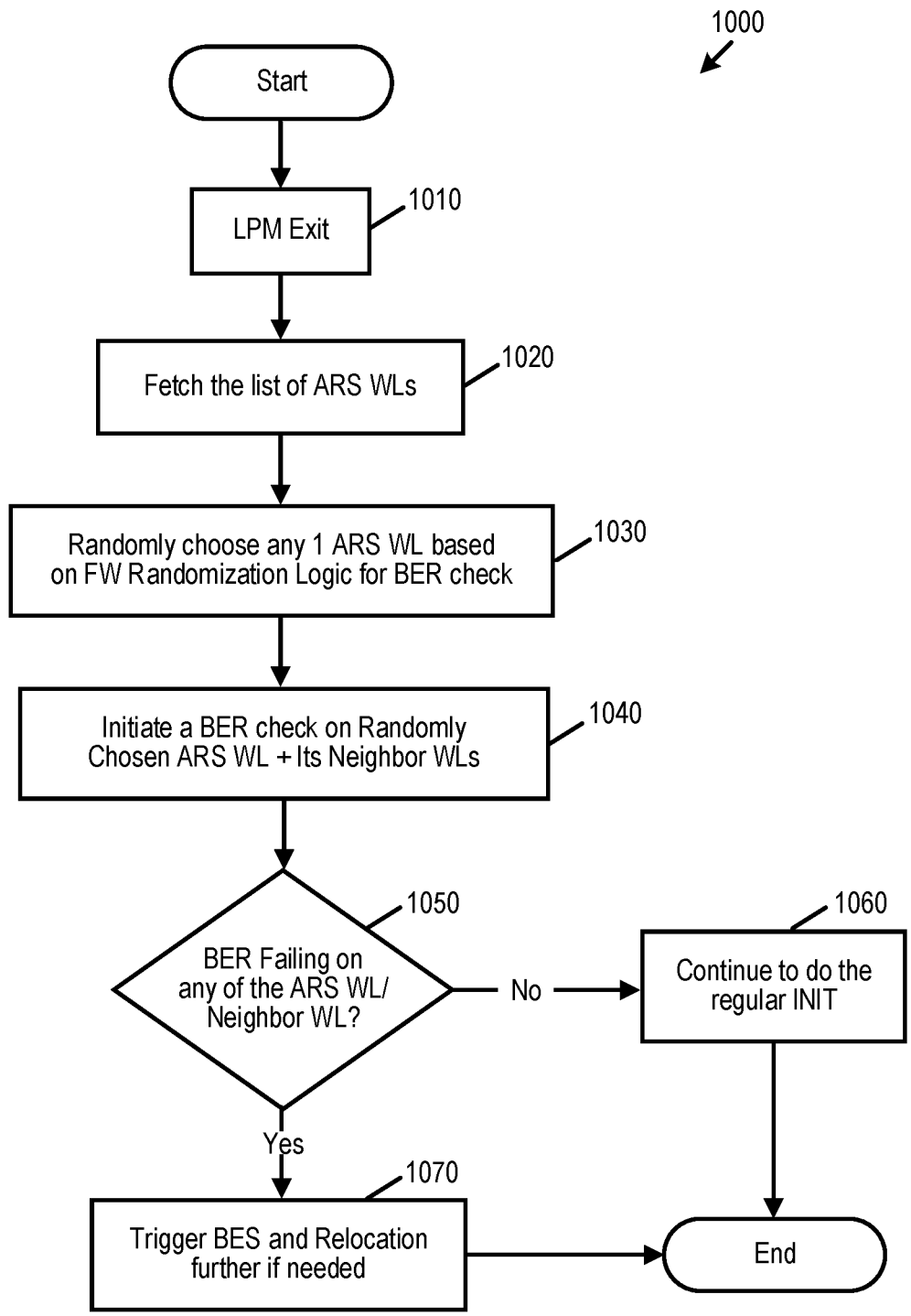
FIG. 10 is flow chart of a method of an embodiment for mitigating read disturbs during a low-power mode.

FIG. 10 is flow chart 1000 of a method of an embodiment for mitigating read disturbs during a low-power mode. As shown in FIG. 10, upon a low-power mode (LPM) exit (act 1010), the controller 102 fetches a list of ARS wordlines (act 1020). Then, the controller 102 randomly (pure randomly or pseudo-randomly) chooses any one ARS wordline based on firmware randomization logic for a BER check (act 1030). The controller 102 then initiates a BER check on the randomly-chosen ARS wordline plus its neighbor wordlines (act 1040). (Instead of or in addition to a BER check, other way(s) of checking for an error can be used.) Next, the controller 102 determines whether there is a BER failure on any of the ARS wordlines or neighbor wordlines (act 1050). If a BER failure is not detected, the controller 102 continues with the regular initialization (act 1060). However, if a BER failure is detected, the controller 102 triggers a (BER) estimation scan (BES) and performs further relocation if needed (act 1070).

There are several advantages associated with these embodiments. For example, a data storage device can experience millions of low-power mode transitions, which can cause read disturb problems. This can arise in situations where the host attempts to save energy by frequently switching between active and low-power modes. Considering the uncertainty of the data storage device staying in the low-power mode while transitioning from low-power mode to active mode, the embodiments presented herein can be used to help optimize the read levels to mitigate any reliability issues caused during the low-power mode state. Also, the read level optimization can be done by performing a BER estimation read on one of the blocks. In the case of consecutive low-power mode transitions, each low-power mode transition can lead to one BER estimation read, and performing successive reads on a block can lead to read disturb phenomena in the block. Also, as mentioned above, the low-power mode transitions can potentially reach up to approximately 10 million, and a significant number of data storage devices can exhibit signs of read disturb. These embodiments can be used to address this problem, effectively mitigating the read disturb issue during low-power mode transitions.

Further, the data storage device of these embodiments can support more low-power mode transitions throughout life span of the data storage device and keep reliability unimpacted. As data storage devices are aggressively moving towards power-saving schemes, these embodiments can be used to make data storage devices ready for future use cases as well. Additionally, these embodiments can provide implementation flexibility in the future by keeping the BER check timing configurable inside firmware/system handling. Based on future memory health, users can reduce/increase the frequency and change the timing flexibly. Also, limited BER estimation reads in the low-power mode path can improve the low-power mode exit latency, and the data storage device can be ready for host operations faster than before. For example, assuming a one terabyte drive capacity with eight memory dies having 48 time-tag read levels, the data storage device can be faster by ~30 ms per each low-power mode exit. This provides a more-robust data storage device that can support a high number of low-power mode transitions. Regarding the time tag update, CVD tracking is a system solution that manages read level offsets in order to minimize read errors and avoid LDPC decode throughput from becoming the bottleneck of read performance. Periodic time tag update is the process of keeping time tag parameters (read levels) up-to-date especially after a power cycle or power mode transition.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
   a memory; and
   one or more processors, individually or in combination, configured to:
      receive a command from a host to exit a low-power mode; and
      in response to receiving the command from the host to exit the low-power mode:
         use firmware randomization logic to perform a randomization process to randomly select a single wordline from a set of wordlines in the memory designated for an active read scan;
         perform a bit error rate (BER) check on the randomly-selected single wordline and its two directly adjacent neighbor wordlines;

determine whether there is a BER failure on the randomly-selected single wordline or its two directly adjacent neighbor wordlines; and in response to determining that there is a BER failure on the randomly-selected single wordline or its two directly adjacent neighbor wordlines, perform a BER estimation scan (BES) of the memory.

2. The data storage device of claim 1, wherein a different wordline is randomly selected from the set of wordlines each time of a plurality of times that the command to exit the low-power mode is received.

3. The data storage device of claim 1, wherein the one or more processors, individually or in combination, are further configured to:

in response to determining that there is a BER failure on the randomly-selected single wordline or its two directly adjacent neighbor wordlines, relocate the block containing the randomly-selected single wordline or its two directly adjacent neighbor wordlines.

4. The data storage device of claim 1, wherein the one or more processors, individually or in combination, are further configured to:

in response to determining that there is no BER failure on the randomly-selected single wordline or its two directly adjacent neighbor wordlines, perform an initialization process.

5. The data storage device of claim 1, wherein the one or more processors, individually or in combination, are further configured to:

determine the set of wordlines in the memory designed for the active read scan.

6. The data storage device of claim 1, wherein the memory comprises a three-dimensional memory.

7. In a data storage device comprising a memory, a method comprising:

each time of a plurality of times that the data storage device transitions from a low-power mode to an active mode:

using firmware randomization logic to perform a randomization process to randomly select a single wordline in the memory, wherein a different single wordline is randomly selected in response to each time of the plurality of times;

determining whether a number of errors in the randomly-selected single wordline is above a threshold;

in response to determining that the number of errors in the randomly-selected single wordline is above the threshold, relocating data in the randomly-selected single wordline to another wordline in the memory;

determining whether a number of errors in two directly adjacent neighbor wordlines of the randomly-selected single wordline is above the threshold; and in response to determining that the number of errors in the two directly adjacent neighbor wordlines of the randomly-selected single wordline is above the threshold, relocating data in the two directly adjacent neighbor wordlines to other wordlines in the memory.

8. The method of claim 7, wherein data in a block containing the randomly-selected single wordline is relocated to a different block.

9. The method of claim 7, wherein a bit error rate (BER) check is used to determine whether the number of errors in the randomly-selected single wordline is above the threshold.

10. The method of claim 7, wherein the randomly-selected single wordline is randomly selected from a subset of wordlines that are considered relatively-more prone to error than other wordlines in the memory.

11. The method of claim 10, further comprising:
determining which wordlines in the memory are contained in the subset of wordlines.

12. The method of claim 7, further comprising:
using an exclusive-or handling process to recover data in the two directly adjacent neighbor wordlines.

13. The method of claim 7, further comprising:
correcting error(s) in the randomly-selected single wordline.

14. The method of claim 7, further comprising:
using an active read scan (ARS) to detect error(s) in the randomly-selected single wordline.

15. The method of claim 7, further comprising:
in response to determining that the number of errors in the randomly-selected single wordline is above the threshold, performing a bit error rate (BER) estimation scan (BES) of the memory.

16. The method of claim 7, further comprising:
in response to determining that the number of errors in the randomly-selected single wordline is not above the threshold, performing an initialization process.

17. The method of claim 7, wherein the memory comprises a three-dimensional memory.

18. A data storage device comprising:
a memory; and
means for:
receiving a command from a host to exit a low-power mode; and
in response to receiving the command from the host to exit the low-power mode:
using firmware randomization logic to perform a randomization process to randomly select a single wordline from a set of wordlines in the memory designated for an active read scan;
performing a bit error rate (BER) check on the randomly-selected single wordline and its two directly adjacent neighbor wordlines;
determining whether there is a BER failure on the randomly-selected single wordline or its two directly adjacent neighbor wordlines; and
in response to determining that there is a BER failure on the randomly-selected single wordline or its two directly adjacent neighbor wordlines performing a BER estimation scan (BES) of the memory.

* * * * *